United States Patent Office 3,679,367
Patented July 25, 1972

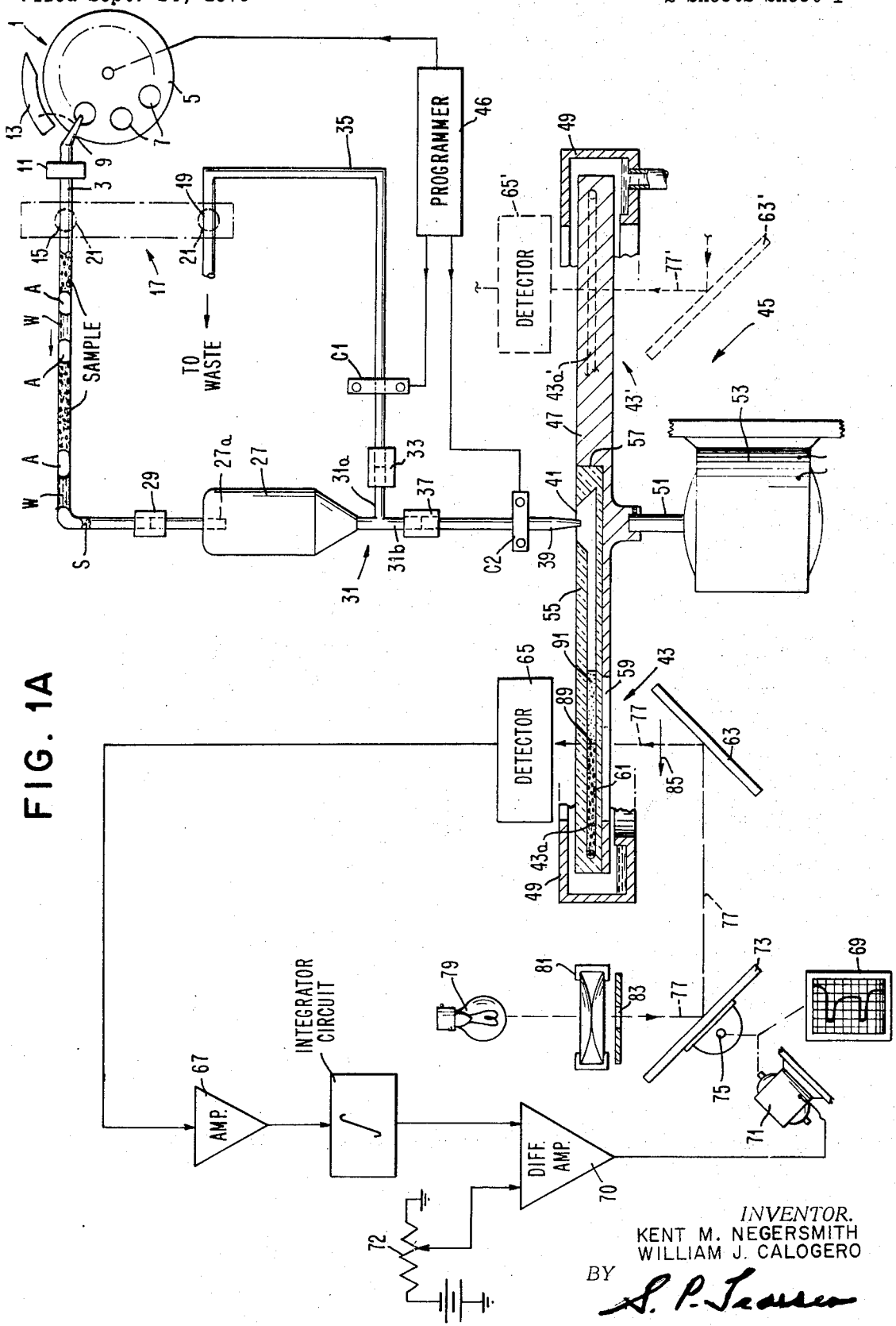

3,679,367
APPARATUS FOR DETERMINING THE PACK VOLUME OF PARTICULATES IN LIQUID MIXTURES
Kent M. Negersmith, Mahopac, and Wililam J. Calogero, Hopewell Junction, N.Y., assignors to Technicon Instruments Corporation, Tarrytown, N.Y.
Filed Sept. 14, 1970, Ser. No. 71,700
Int. Cl. G01n *1/10, 21/00, 33/16;* B04b *5/12*
U.S. Cl. 23—259
56 Claims

ABSTRACT OF THE DISCLOSURE

Blood samples are successively and centrifugally loaded into a same capillary chamber defined in a continuously rotating centrifuge head to measure the respective packed cell volumes. The capillary chamber is open-ended and has a serpentine configuration, i.e., it reverses upon itself, to trap and retain a fixed volume of each successive blood sample for centrifuging. The capillary chamber is purged of a packed blood sample by the introduction of a next successive blood sample.

BACKGROUND OF THE INVENTION

(1) Field of the invention

This invention relates to methods and apparatus for determining the quantity of particulates in fluid mixtures, such particulates having different specific densities and, more particularly, to methods and apparatus for determining the packed cell volume of whole blood samples.

(2) Description of the prior art

The determination of packed cell volume, or PCV, is frequently employed in hematology. Generally, packed cell volume is determined by subjecting a whole blood sample to very high centrifugal forces. As a result, erythrocytes in the blood sample are centrifugally separated from the plasma, and packed into the bottom portion of the capillary chamber. While great advances have been made in the centrifuging equipments, such prior art equipments require the manual loading of a known volume of blood sample into a capillary chamber, and the mounting of such chamber onto a centrifuge head for centrifuging at high speeds, e.g., 10,000–12,000 r.p.m. to obtain a high centrifugal force.

In present-day equipment, a plurality of blood samples can be packed, and the respective packed cell volumes can be determined concurrently. However, the centrifuge system must be disabled to allow loading of one or more blood samples into the system, which severely limits the processing rate. In addition, the individual blood samples loaded into capillary chambers had to be individually identified to retain a proper sample-source relationship. Usually, such sample identification has been done manually. For example, the proper identification of the liquid samples is a paramount importance in clinical analysis, the processing rate being of importance primarily in reducing cost. This need for continuous intervention limited the efficiency of the prior art systems, as well as introduced numerous sources of errors.

OBJECTS OF THE INVENTION

Accordingly, an object of this invention is to provide method and apparatus which eliminates the need for human intervention in clinical analysis, and more particularly, in determining the packed cell volume of whole blood samples.

Another object of this invention is to insure the loading of precise quantities of blood samples automatically into a capillary chamber for centrifuging.

Another object of this invention is to provide for the loading of a same capillary chamber with successive blood samples, in precise quantities and in continuous fashion, while avoiding contamination between the successive blood samples.

Another object of this invention is to provide automatic means for determining the packed cell volume of each of a plurality of blood samples, supplied as a continuous flowing stream.

Another object of this invention is to provide for a method and apparatus for determining the respective quantities of constituents of different specific gravities in a fluid mixture.

SUMMARY OF THE INVENTION

These and other objects and features of this invention are achieved by defining, in a continuously rotating centrifuge head, an open-ended capillary chamber having a serpentine configuration, i.e., J-shaped, S-shaped, etc., so as to define a trap-like portion for retaining a fixed volume of blood sample for centrifuging. Generally, a slightly excess volume of blood sample is centrifugally introduced into the capillary chamber while the centrifuge head is rotated, so as to insure that a proper volume of sample is present in the capillary chamber during centrifuging.

In accordance with the preferred embodiment of the invention, individual blood sample segments are directed along a conduit as a continuous-flowing stream, successive sample segments being separated by a wash liquid segment and intervening air segments. The blood samples are introduced successively into a central loading well in the centrifuge head, which is in flow communication with the capillary chamber. The wash liquid segments, which are used to prevent contamination between successive blood samples, are by-passed and discharged to waste. The loading of successive blood sample segments is effected without regard to the position of the centrifuge head, and such segments are centrifugally forced into and through the open-ended capillary chamber. A predetermined volume of blood sample segment is retained in the trap-like portion and centrifuged. The packed cell volume of the erythrocytes can be measured optically, and the results automatically identified and recorded.

It is preferred that the individual blood samples are introduced at a very rapid rate into the central loading well, so as to supplement the contrifugal forces and insure a complete purging of the packed blood cell from the capillary chamber. To this end, each blood sample in the continuous stream is accumulated in a closed storage chamber, so as to develop a pressure head within such chamber. The output of the storage chamber is valved along a conduit positioned to introduce each pressured blood sample segment into the loading well without interfering with the continuous rotation of the centrifuge head. The valving of the storage chamber output is appropriately phased with the flow of the continuous stream. Both dilution and contamination of successive blood sample segments is avoided by passing the wash liquid samples through the storage chamber before being passed to waste.

Other features of this invention include the provision of multiple capillary chambers along with corresponding loading wells in a single centrifuge head structure, so as to allow for the concurrent loading and packing of a plurality of blood sample segments. In such event, blood sample segments to be packed concurrently are directed in different continuous streams which are properly phased. Such features include, also, the provision of a well arrangement for passing the packed cells purged from the capillary chamber to waste, whereby such cells are discharged into a waste well defined within the centrifuge head and are continuously and positively removed without interfering with the continuous operation of the system.

Also, the individual blood samples can be analyzed concurrently for other constituents. In such event, a portion of each blood sample segment and its corresponding wash fluid segment is separated from the continuous stream, and is directed to other automatic analysis equipment, for example, as shown in the S. Adler et al. patent application, Ser. No. 71,703, filed on even date herewith and assigned to a common assignee. Preferably, the respective operations of such automatic analysis equipment and the automatic centrifuge apparatus of this invention are properly phased, such that the analysis results and the packed cell volume can be recorded concurrently to provide a complete patient profile.

DESCRIPTION OF THE DRAWINGS

FIG. 1A is a diagrammatic illustration of the method and apparatus of the present invention, wherein the automatic centrifuge apparatus is shown in cross-section.

DETAILED DESCRIPTION OF THE INVENTION

Figure 3:
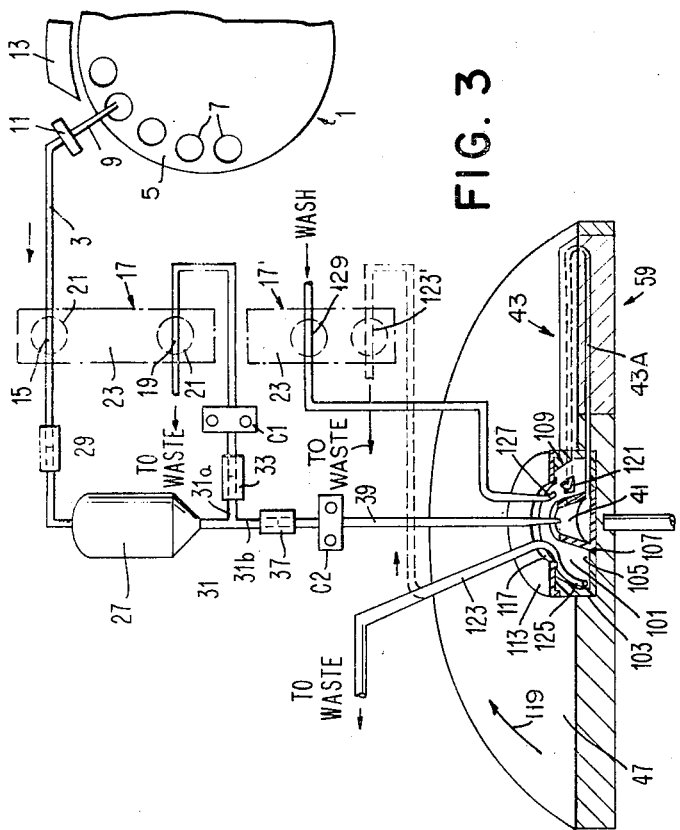
FIG. 3 shows a partial cross-sectional view of a waste chamber from which the packed cells discharged from the capillary chamber can be passed to waste, and which may be incorporated into the system shown in FIG. 1A.

Referring to FIG. 1A, an automatic centrifuge system according to the present invention comprises a source, generally indicated as 1, for providing a stream of different blood sample segments, one after another, along a conduit 3. Each blood sample S along conduit 3 is separated by a wash liquid segment W disposed between a pair of air samples A, as illustrated. Source 1 comprises a turntable 5 carrying a plurality of sample receptacles 7 and which is indexed to position each sample receptacle 7 below an off-take tube 9. Off-take tube 9 is supported laterally of turntable 5, and controlled by suitable mechanism 11, for example, as described in U.S. Pat. No. 3,134,263, issued on May 26, 1964, to move into and out of a sample receptacle 7 located beneath it during each dwell period of turntable 5. Also, a wash-liquid container 13, for example, containing a 0.9% saline solution, is positioned adjacent turntable 5. Off-take tube 9 is further controlled by mechanism 11 to rotate laterally to move into and out of container 13, preferably when turntable 5 is being indexed to advance a next sample receptacle 7 beneath off-take tube 9.

Off-take tube 9 is in flow communication with pump tube 15 of peristaltic pump 17. Pump 17 may be of the type described in the A. Ferrari et al. Pat. No. 2,935,028, issued on May 3, 1969, and the Eduard B. M. de Jong Pat. No. 3,134,263, issued on May 26, 1964. In addition, pump 17 includes at least another pump tube 19, hereinafter further described. It should be understood, however, that any number of additional pump tubes may be included in pump 17, for example, if concurrent analysis of other constituents of interest is to be concurrently effected, for example, as described in the above-identified Adler et al. patent application. Pump 17 comprises a plurality of continuously moving parallel rollers, symbolically illustrated by circles 21, which compress so as to progressively occlude pump tubes 15 and 19 against a platen 23. Accordingly, fluid, whether gaseous or liquid, along pump tubes 15 and 19 is forced to flow in the direction of roller movement, as indicated by the arrow, and a suction is continuously applied at the inlet side of the pump tubes. As a result, off-take tube 9 successively aspirates a portion of blood sample contained in each receptacle 7 advanced to the off-take position, and segments of air, wash liquid, and air segments, in turn, between successively aspirated blood sample segments, so as to form a continuous-flowing stream along conduit 3. The volume of each of the segments can be conveniently controlled by determining the immersion time of off-take tube 9 in each sample receptacle 7 and reservoir 13, respectively, and the time interval between successive immersions while off-take tube 9 is exposed to the atmosphere. The wash liquid segments W and air segments A cooperate to thoroughly scrub and cleanse the interior wall surfaces of conduits along which the continuous stream is directed, and effectively remove residues from a previously passed blood sample segment S to prevent contamination between successive blood sample segments.

The continuous stream pumped along pump tube 15 is passed along conduit 25 at a constant flow rate, and introduced into storage chamber 27 having a fluid inlet 27a. Conduit 25 is connected to the fluid inlet 27a of storage chamber 27 along a coupling 29. The fluid outlet 31 of storage chamber 27 is formed in a T configuration to define a pair of fluid outlets 31a and 31b. Storage chamber 27, fluid inlet 27a, and fluid outlet 31 can be formed as an integral glass structure, if desired. Outlet 31a is connected along coupling 33 to a flexible conduit 35 which is in flow communication with pump tube 19 which passes to waste; outlet 31b is connected along coupling 37 to a flexible conduit 39 which is adapted to discharge the contents of storage chamber 27 into loading well 41 for introduction into the centrifuging apparatus, generally indicated as 45.

Figure 2:
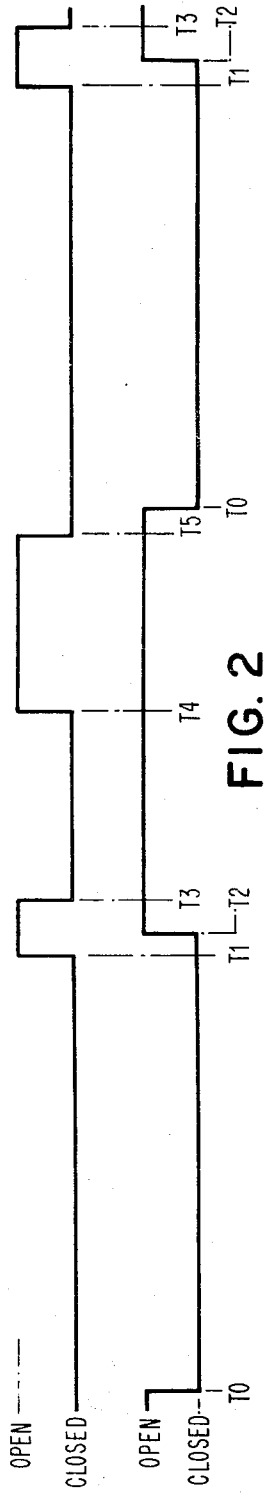
FIG. 2 illustrates the time sequence of operation of the valving arrangement associated with the storage chamber, so as to increase the effective rate of introduction of fluids into the centrifuge system.

Flexible conduits 35 and 39 are positioned between pinch clamps C1 and C2, respectively, which are controlled by programmer 46, clamps C1 and C2 are controlled such that blood sample segments S directed along fluid inlet conduit 27a are individually accumulated within storage chamber 27 and the intervening wash liquid segments W are discharged to waste. While a blood sample segment S is being packed and the next successive wash liquid segment W is being introduced into storage chamber 27, clamp C1 is opened and clamp C2 is closed by programmer 46. Such wash liquid segment W cleanses the interior of storage chamber 27, and passes to waste along conduit 35 and pump tube 19. Immediately prior to a blood sample segment S being introduced into storage chamber 27, at time T0 of FIG. 2A, clamps C1 and C2 are closed by programmer 46 to "pinch-off" conduits 35 and 39, respectively, and seal storage chamber 27. During time T0–T1, the continuous stream introduced into fluid inlet conduit 27a is forced pumped, a blood sample segment S is individually accumulated and a pressure head is developed within storage chamber 27. When the blood sample segment S has been accumulated in storage chamber 27, clamp C2 is opened by programmer 46 during time T1–T2; at such time, clamp C1 remains closed and the accumulated blood sample in storage chamber 27 is forced under pressure along fluid outlet 31b and conduit 39 into loading well 41. Due to the pressure head developed within storage chamber 27, each accumulated blood sample segment S is introduced into loading well 41 at a rate which is significantly higher than if such sample had been introduced directly along conduit 25 into loading well 41. The blood sample segment S introduced into loading well 41 is centrifugally forced into capillary chamber 43, as hereinafter described, for centrifuging.

When the accumulated blood sample segment S has been discharged from storage chamber 27 into loading well 41, at time T2, programmer 46 opens valve C1; at this time, valve C2 remains opened. Accordingly, conduit 39 and the interior of storage chamber 27 are connected along conduit 35 and pump tube 19 to waste. Vestiges of liquid remaining in storage chamber 27 and conduit 39, the latter being due to the fact that the storage chamber is unvented, are aspirated and cleared to waste. Since conduit 39 is opened to atmosphere, such conduit is initially cleared and in effect "leaks" the system. Passage of air through conduit 39 effectively cleanses the interior wall surfaces to avoid contamination of a next successive blood sample. At time T3, programmer 46 closes valve C2 to pinch-off conduit while maintaining clamp C1 opened. During time T3–T4, a next wash liquid segment W is introduced into storage chamber 27 along fluid inlet 27a. Since clamp C1 is opened, such wash liquid segment is passed through storage chamber 27 and along conduit 35 and is discharged to waste. In the process, storage chamber 27 is cleansed of any residues of a preceding blood sample segment S. As the next succeeding air segment A is being introduced into storage chamber 27, the storage chamber is drained of wash liquid along conduit 35 by the action of pump 17. To avoid low pressures due to the the aspirative action of pump 17 along conduit 35 and to insure a build-up pressure head in storage chamber 27 when a next blood sample segment S is introduced, clamp C1 remains opened and clamp C2 is momentarily opened during time T4–T5 to vent the storage chamber. When clamp C2 is closed by programmer 46 at time T5, storage chamber 27 is prepared to accumulate a next blood sample segment S in the continuous stream being directed along conduit 25 and fluid inlet 27a when clamp C1 is again closed at time T0. This cycle is repeated for each blood sample segment S to be introduced into centrifuge apparatus 45. Additionally, programmer 46 is operative to control turntable 5 and mechanism 11, so as to maintain a proper phase relationship between the operation of clamps C1 and C2 and the introduction of the continuous stream into storage chamber 27.

The centrifuging apparatus for receiving each blood sample segment S discharged from storage chamber 27 along conduit 39 comprises a circular centrifuge head 47 whose periphery is positioned within an annular container 49. Centrifuge head 47 is fixedly mounted on a spindle 51 which is connected to the armature of drive motor 53. Drive motor 53 is continuously operated to rotate centrifuge head 47, say, to subject each blood sample, when loaded, to approximately 23,000 G's.

Figure 1B:
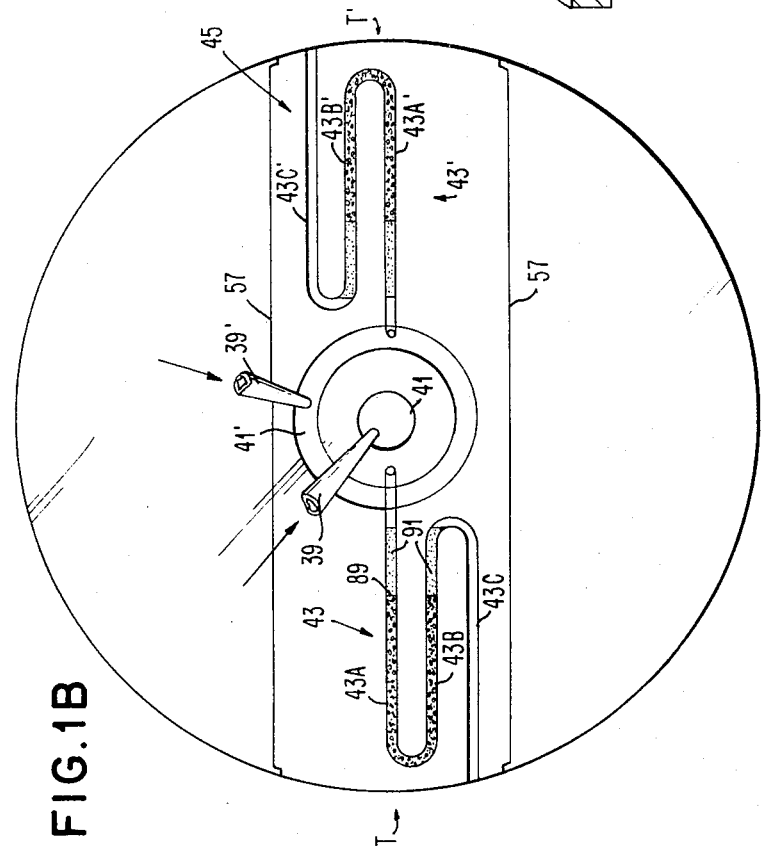
FIG. 1B shows the top view of the centrifuge head of FIG. 1A and illustrates in dashed outline the provision of a second capillary chamber on the centrifuge head.

As more particularly illustrated in FIG. 1B, a serpentine capillary chamber 43 is defined in centrifuge head 47 which communicates at its inlet end with an inverted funnel-shaped loading well 41. It is evident that loading well 41 can be formed in numerous configurations, for example, as an annular recess concentric with the axis of rotation of centrifuge head 47. As illustrated, conduit 39 extends slightly into the loading well 41, so as to load successive blood sample segments S without regard to the position of centrifuge head 47.

Capillary chamber 43 may be formed of a glass tube of uniform bore, and having at least one portion which reverses upon itself in serpentine fashion, so as to define a fluid trap T along an intermediate portion thereof. Although capillary chamber is shown to include legs 43a, 43b, and 43c and define an S-shaped configuration, a J-shaped configuration could be defined by eliminating all or a portion of terminal leg 43c, or any other serpentine configuration could be utilized which reverses upon itself, so as to effectively trap liquid when subjected to centrifugal forces. Also, the terminal end of capillary chamber 43 is open-ended to allow for overflow of excess liquids introduced into capillary chamber 43. The provision of a fluid trap T, here defined by legs 43a and 43b, in capillary chamber 43 insures that a same volume of blood sample, e.g., 0.05 ml. is centrifuged, regardless of the quantity of sample which may be introduced into loading well 41.

If desired, capillary chamber 43 along with loading well 41 can be formed as an integral structure, and contained in a light-transparent insert 55, for example, formed of an epoxy material. Insert 55 is fitted within a recess 57 machined in centrifuge head 47, and retained therein by conventional means, e.g., clamping, etc., not shown. In addition, a viewing window 59 having a lateral dimension equal to or slightly less than capillary chamber 43 is machined through the base of recess 57 and aligned, for example, with leg 43a of capillary chamber 43. The longitudinal dimension of window 59 corresponds to an intermediate portion of leg 43a when filled with a blood sample to be packed, for example, from a packed cell volume of between 15% and 70%. As hereinafter described, it is only necessary to measure the packed cell volume in one of the legs 43a or 43b of trap T, although the packed cell volume in either or both legs can be measured, if desired.

To more particularly described the operation, assume that a blood sample segment S has been centrifuged and that the volume of packed cells 61, as shown in FIG. 1B, has been measured. At time T1, clamp C2 is opened by programmer 46 and the next successive blood sample segment S accumulated in storage chamber 27 is rapidly discharged under pressure into loading well 41. The large volume of liquid immediately available in loading well 41 is centrifugally forced into and purges the contents of capillary chamber 43. The packed cells 61 contained in trap T of capillary chamber 43 are purged along leg 43b in opposition to the centrifugal forces and outwardly along leg 43c, so as to be discharged against the interior walls of container 49 and passed to waste. To insure adequate cleaning and prevent sample contamination, the volume of a blood sample segment S is preferably six to eight times the volume of trap T of capillary chamber 43, the leading portion of each blood sample being used to purge the packed cells 61 and, also, remove or wash any residues of a previously centrifuged blood sample segment from capillary chamber 43, and only the trailing portion of the introduced blood sample segment being trapped in trap T and centrifuged.

As each blood sample segment S is introduced into capillary chamber 43, the erythrocytes, or cells, are subjected to centrifugal forces along legs 43a and 43b. The pumping effect due to that portion of each blood sample segment S being centrifugally forced along leg 43c and from the outlet of capillary chamber 43, which is in opposition to the centrifugal force along leg 43b, results in an increased concentration of erythrocytes along leg 43b as compared with the concentration along leg 43a. The flow of blood sample segment S along capillary chamber 43 continues until the supply in loading well 41 is exhausted. At such time, the portion of blood sample segment S along leg 43c is centrifugally forced from capillary 43 into container 49, whose interior walls may be continuously rinsed by conventional means, not shown, to prevent any accumulation of the discharged cells and insure their passage to waste; that portion of the blood sample segment S present in trap T is retained and centrifuged, whereby erythrocytes are packed into the radially exterior U-shaped portion. Because of the increased concentration of erythrocytes, or cells, in leg 43b, the packed cell volumes in legs 43a and 43b, respectively are slightly unequal. However, there is a direct correlation between the packed cell volume in each of legs 43a and 43b, and either or both may be measured. It has been determined that measurements of the packed cell volume in either or both legs 43a and 43b of the capillary chamber correlate with measurements made on conventional centrifuge equipments.

The packed cell volume in leg 43a can be sensed optically. For example, as shown in FIG. 1A, the plane of rotation of centrifuge head 47 is located between a stationary mirror 63 and a light detector arrangement 65. Mirror 63 and detector 65 are aligned, so as to be exposed through window 59 and capillary chamber 43 during each revolution of centifuge head 47. The output of detector 65 is connected to an amplifier 67, the output of which is coupled via a fast-response integrator circuit 66 to a first input of a differential amplifier 70; an offset voltage developed across potentiometer 72 is normally applied to a second input of differential amplifier 70, the output of which is coupled to a motor 71 having an armature 75. A mirror 73 is fixedly mounted onto armature 75, and positioned to reflect light beam 77, defined by aperture 83 and directed from light source 79 and through collimating lense arrangement 81 onto mirror 63. The offset voltage developed across potentiometer 72 and normally applied to the second input of differential amplifier 70 is sufficient to energize motor 71 to maintain light beam 77 at the inner-radial end of window 59. Light beam 77 is caused to move outwardly, as indicated by the arrow 85, when mirror 73 is rotated in a counter-clockwise direction by motor 71.

When a blood sample segment S has been introduced into capillary chamber 43, mirror 73 has been reset, as hereinafter described, and light beam 77 is located at the inner-radial end of window 59. As the blood sample segment in capillary chamber 43 is being packed and since plasma 91 is transparent, light beam 77 is, in effect, modulated and a pulse of light passes through capillary chamber 43 and onto detector 65 during each revolution of centrifuge head 47. Each pulse of light incident on detector 65 operates amplifier 67 to charge integrator circuit 66, whereby the voltage applied to the first input of differential amplifier 70 rapidly and continuously increases in opposition to the offset voltage coupled to the second input of the differential amplifier. Accordingly, motor 71 is energized to cause mirror 73 to rotate in a counter-clockwise direction, as indicated by the arrows, whereby light beam 77 is advanced outwardly along a radius of centrifuge head 47. Due to the charging action of integrator circuit 66, light beam 77 tracks continuously the interface 89 between plasma 91 and packed cells 61 in leg 43a. When cells 61 have been packed and interface 89 is fixed, light beam 77 will remain substantially fixed at the interface, the position of mirror 73 being indicative of the packed cell volume in the capillary chamber 43. Actually, the light beam 77 tends to oscillate slightly about interface 89, due to the momentary charging and discharge of integrator circuit 66. For example, when light beam is positioned at interface 89, the total illumination of detector 65 is slightly reduced, which results in a momentary discharging of integrator circuit 66 and a corresponding reduction of the voltage applied to the first input of differential amplifier 70. Accordingly, motor 75 rotates mirror 73 in a clockwise direction and locate beam 77 radially inwardly, so as to pass through the plasma 91 and be incident on detector 65. Such radially inwardly movement of light beam 77 causes integrator circuit 66 to recharge, thereby causing motor 75 to rotate mirror 73 in a counter-clockwise direction, such that the total illumination on detector 65 is slightly reduced, whereby the process is repeated. If desired, an indicator, not shown, can be keyed to mirror 73 to visually indicate the packed cell volume in capillary chamber 43. Alternatively, recorder 69 can include a conventional stylus arrangement, the stylus being keyed, for example, to the rotation of mirror 73, as indicated by the connecting line, to provide a continuous trace along a moving web of trace paper in the recorder, the maximum excursions of the stylus being indicative of the packed cell volume and the sloping portion of the curve being a function of the rate of cell packing, which is an indication of the viscosity of the plasma of the blood sample segment.

When the packed cell volume in capillary chamber 43 has been measured, programmer 46 opens clamp C2 at next-subsequent time T1 to introduce a next successive blood sample segment S into capillary chamber 43, purging the packed cells which have been previously measured. The loading of the next successive blood sample segment S into capillary chamber 43, since it is opaque, effectively shields detector 65 from light beam 77. Accordingly, integrator circuit 66 rapidly discharges and the offset voltage applied at the second input of differential amplifier 70 causes motor 75 to rotate mirror 73 in a clockwise direction and reset light beam 77 at the inner-radial end of window 59, until such time that the cells to pack and a corresponding interface 89 is defined. The loading, packing and measurement of the packed cell volume of each blood sample segment S can be effected well within sixty seconds, so as to be compatible with concurrent "wet chemistry" analysis, as shown and described in above-identified Adler et al. patent application.

Also, a plurality of blood sample segments S can be centrifuged concurrently in a sample centrifuge head. As shown in FIG. 1B, a second capillary chamber 43' having a serpentine configuration can be provided in insert 55', and arranged diametrically with respect to capillary chamber 43. The corresponding loading well 41' can be formed in concentric fashion with respect to loading well 41 associated with capillary chamber 43, previously described. Blood sample segments S are directed into loading well 41' along conduit 39', which is connected with the fluid outlet of a storage chamber, not shown, similar to storage chamber 27 of FIG. 1A. In such event, programmer 46 would be adapted to control an additional source of blood sample segments S and wash fluid segments W, corresponding to source 1 and not shown, and, also, a clamping arrangement, corresponding to clamps C1 and C2 and not shown, to insure that blood sample segments S are discharged concurrently along conduits 39 and 39' into loading wells 41 and 41', respectively. The packed cell volume in second capillary chamber 43' can be optically sensed by duplicating the read-out equipment, hereinabove described, as represented by capillary chamber 43a', light beam 77', mirror 63' and detector 65' as shown in dashed outline in FIG. 1A. Detectors 65 and 65' can be keyed to the rotation of centrifuge head 47, in conventional fashion, so as to be enabled only during passage of the corresponding capillary chamber 43 and 43' therebetween and mirrors 53 and 53', respectively. The packed cell volumes in legs 43a and 43a', therefore, can be measured and the results recorded individually. For example, recorder 69 can be a conventional twin-stylus arrangement, each individual stylus being keyed to the read-out equipment corresponding to capillary chambers 43 and 43', respectively, or a separate recorder can be keyed to the read-out equipment associated with capillary chamber 43', as hereinabove described.

FIG. 3 illustrates an alternate embodiment of the present invention, wherein the same reference characters have been used to identify corresponding structures. The showing of FIG. 3 differs from the showing of FIG. 1A, essentially, in the provision of a waste well 101 defined within centrifuge head 47, in lieu of annular container 49. The provision of waste well 101 within centrifuge head 47 provides a more compact apparatus and, also, minimizes the splattering of the packed cells purged from capillary chamber 43. FIG. 3 does not illustrate the provision of an insert member, such as 55 shown in FIG. 1A. Alternatively, the capillary chamber 43 and loading well 41 can be formed as a unitary glass structure, which is received within a recess 103 defined in centrifuge head 47, leg 43a being located over window 59 as described. A transparent epoxy material is provided to maintain such unitary glass structures fixed within recess 103 and centrifuge head 47; such epoxy material can also be provided within window 59, as shown. Recess 103 is further adapted to receive the lower portion of waste well 101, which is defined by circular plate 105 having a central aperture 107 and an upwardly extending annular shoulder 109. Shoulder 109 has inner surfaces defining a frusto-conical volume. Loading well 41 is received through central aperture 107 when plate 105 is seated within recess 103. Upper portion of waste well 101 is defined as a circular plate 113 having an annular shoulder along its outside edge for engaging a complementary recess in annular shoulder 109. In addition, plate 113 includes a central aperture 117, which is aligned with the opening in loading well 41, when plate 105 is seated, as shown.

The operation of the showing of FIG. 3 is essentially as described with respect to the embodiment of FIG. 1A. As described, the 27 chamber operates to discharge each accumulated blood sample segment S into loading well 41, as controlled by the clamps C1 and C2, and into the inlet end of the capillary chamber 43 and along leg 43a. However, the outlet leg 43c of the capillary chamber 43 is shortened and, rather than extending to the periphery of the centrifuge head 47, extends through a second aperture 121 directly into waste well 101. Preferably, the outlet end of shortened leg 43c is disposed adjacent the lower outer radial portion of waste well 101 and defines, essentially, a J-shaped configuration. Accordingly, the discharge from capillary chamber 43 and along leg 43c is directed into the outer radial portion well 101 for subsequent removal to waste. The centrifugal force developed by the rapid rotation of centrifuge head 47, as shown by arrow 119, retains such discharge along the inside walls of shoulder 109, so as to avoid spattering of any such discharge and any possible contamination of a next blood sample segment present in loading well 41.

To effect removal of discharged packed cells, along with plasma and portions of the next succeeding blood sample S used for washing capillary chamber 43, a waste probe 123, which can be made of any suitable material, e.g., stainless steel, extends into waste well 101, as illustrated, and terminates in a small bend 125. Bend 125 is located adjacent to the lower outer radial portion of waste well 101 and oriented opposite to the direction of rotation of centrifuge head 47, as indicated by the arrow 119. Also, waste probe 123 can be open-ended to waste, as shown, such that the discharge, because of the very high momentum, is self-pumping or, alternatively, it is connected along a conduit to a pump tube 123' included in peristaltic pump 17', as shown in dashed fashion. Also, a wash probe 127 extends into waste well 101 and is connected to pump tube 129 included in peristaltic pump 17'. The inlet of pump tube 129 is connected to a continuous source of wash liquid, not shown. As indicated by the arrows, wash liquid is continuously introduced into the waste well 101 along pump tube 129 and probe 127 and any discharge present in waste well 101 is continuously removed. Preferably, wash probe 127 extends into waste well 101 and adjacent the outer radial portion of waste well 101, so as to avoid splashing of wash liquid into the loading well.

In operation, the centrifugal forces due to the rotation of the centrifuge head 47 cause the wash liquid and, also, any discharge from capillary chamber 43 outwardly, so as to be uniformly distributed along the vertical portions of the inside surface of shoulder 109; the presence of the wash liquid, along with the rotation of centrifuge head 47, causes the packed cells purged from capillary chamber 43 to be broken up and more easily removed from waste well 101 along waste probe 123. Also, the continuous rotation of centrifuge head 47, as indicated by the arrow, causes a continuous flow of the discharge present in waste well 101 into the open end of waste probe 123, with sufficient force as to be self-pumping. Alternatively, waste probe 121 and conduit 123 can be connected to the aspirating end of pump tube 123' to positively insure removal of the discharge from waste well 101. Obviously, and in either event, the capacity of waste probe 121 should be sufficient, at least, to prevent any accumulation of the waste liquid waste well 101.

As hereinabove indicated, the continuous centrifuge system can be employed concurrently with other "wet-chemistry" systems for concurrently analyzing other constituents in the blood sample segments S. Also, the recordings, or tracings, provided on recorder 69 can be particularly identified with the source individual and, also, in correlation with any other analytical tests performed on a corresponding blood sample segment S by conventional sample identification systems, for example, as described in the B. L. Kuch Pat. No. 3,320,618 issued on May 16, 1967. In such event, a token bearing a coded notation identifying the source individual is affixed to each receptacle 7 on turntable 5, and is automatically read-out as the turntable is indexed. The read-out mechanism can be adapted to control, for example, a printer included within recorder 69 to print the identity of the source individual in correlation with the corresponding trace then being made. In the interest of simplicity, such apparatus has not been shown but is within the contemplation of the present invention.

While we have shown and described the preferred embodiment of our invention, it will be understood that the invention may be embodied otherwise than as herein specifically illustrated or described, and that certain changes in the form and arrangement of parts and in the specific manner of practicing the invention may be made without departing from the underlying idea or principles of this invention within the scope of the appended claims.

What is claimed is:

1. Apparatus for determining the quantity of particulates in liquid mixtures comprising, a centrifuge head adapted to be rotated about an axis, first loading well means and first chamber means defined within said centrifuge head, and said first chamber means having a fluid inlet in flow communication with said first loading well means for receiving liquid mixture therefrom, said first chamber means reversing upon itself in serpentine configuration to define a fluid trap along a portion thereof for centrifugally retaining said liquid mixture received from said first loading well when said centrifuge head is rotated to allow measurement of particulates in said retained liquid mixture.

2. Apparatus according to claim 1, wherein said first loading well means and said first chamber means are formed as an integral structure, and means for receiving and retaining said integral structure in said centrifuge head.

3. Apparatus according to claim 1 wherein said first loading well means is coaxial with said axis.

4. Apparatus according to claim 1 wherein the fluid outlet of said first chamber means is open-ended.

5. Apparatus according to claim 1 wherein said first loading well means is coaxial with said axis and is open-ended, and means disposed substantially along said axis for supplying liquid mixture to said first loading well.

6. Apparatus according to claim 5, wherein rotation of said centrifuge head is effective to centrifugally pack any particulates contained in the liquid mixture portion along the outer radial portions of said trap-like portion, and means for measuring the volume of said particulates packed in said trap-like portion.

7. Apparatus according to claim 5 further including means for rotating said centrifuge head about said axis, said rotating means being operative concurrently with said supplying means and while said liquid mixture is being received in said first loading well means, so as to centrifugally force said liquid mixture from said first loading well means into said first chamber means.

8. Apparatus according to claim 7 wherein said rotating means is operative to continuously rotate said centrifuge head.

9. Apparatus according to claim 5 wherein said supplying means include means for successively and intermittently introducing different liquid mixtures into said first loading well means, said different liquid mixtures being successively and centrifugally forced, in turn, into said first chamber means, such that at least a portion of each of said different liquid mixtures is retained, in turn, in said trap-like portion while said centrifuge head is rotated.

10. Apparatus according to claim 9 wherein said trap-like portion of said first chamber means has a first volume, and said introducing means is operative to successively introduce respective volumes of said different liquid mixtures, at least, in excess of said first volume.

11. Apparatus according to claim 9 wherein said introducing means is operative to introduce a next successive liquid mixture into said first loading well means while a previously introduced liquid mixture is centrifugally retained in said trap-like portion of said first chamber means, so as to purge said previously introduced liquid mixture from said trap-like portion when said successive liquid mixture is centrifugally forced into said first chamber means.

12. Apparatus according to claim 9, wherein rotation of said centrifuge head is effective to centrifugally pack any particulates in the different liquid mixtures successively retained in said trap-like portion, and means for measuring the respective volumes of packed particulates in each of the said different liquid mixtures centrifugally retained in said trap-like portion.

13. Apparatus according to claim 12 wherein said measuring means includes means for optically measuring the respective volumes of said packed particulates, said rotating means and said measuring means being operative concurrently.

14. Apparatus according to claim 12 further including recording means responsive to said measuring means.

15. Apparatus according to claim 14 where said measuring means includes means for continuously measuring the packing of said particulates in each of said different liquid mixtures introduced into said first chamber means, whereby the packing rate of each of said different liquid mixtures is indicated.

16. Apparatus according to claim 1, wherein said first chamber means is formed in a J-shaped configuration.

17. Apparatus according to claim 1, wherein said first chamber means is formed in a S-shaped configuration.

18. Apparatus according to claim 1 wherein said first chamber means has a fluid outlet extending to the periphery of said centrifuge head, an intermediate portion of said first chamber means being formed in said serpentine configuration, so as to define said trap-like portion.

19. Apparatus according to claim 18 further including container means disposed about the periphery of said centrifuge head for receiving fluids and particulates passing through said first chamber means.

20. Apparatus according to claim 1 further including waste well means defined in said centrifuge head, said waste well means being formed in concentric fashion with respect to said first loading well means, said first chamber means having a fluid outlet in flow communication with said waste well means.

21. Apparatus according to claim 20 wherein said waste well means is disposed between said axis of said centrifuge head and said trap-like portion of said first chamber means.

22. Apparatus according to claim 20 wherein said waste well means is open-ended, and further including waste probe means having a fluid inlet portion extending into said waste well means for removing fluids and particulates passing through said first chamber means and into said waste well means.

23. Apparatus according to claim 22 further including means for rotating said centrifuge head about said axis and in a first direction, said fluid inlet portion of said waste probe means being oriented in a direction substantially opposite to said first direction.

24. Apparatus according to claim 23 wherein said waste probe means has a fluid outlet portion which is open-ended, the rotation of said centrifuge head imparting sufficient momentum to cause fluids and particulates passing through said first chamber means and into said waste well means to be self-pumping from said waste well means along said waste probe means.

25. Apparatus according to claim 22 wherein said waste probe means has a fluid outlet portion, and pump means connected to said fluid outlet portion of said waste probe means for positively removing fluids and particulates through said first chamber means and from said waste well means along said waste probe means.

26. Apparatus according to claim 22 wherein the lower portions of the inner surfaces of said waste well means are substantially parallel with said axis of rotation of said centrifuge head, and the upper portions of said inner surfaces of said waste well means are inclined towards said axis of rotation of said centrifuge head, said fluid inlet of said waste probe means being positioned adjacent said lower portions of said inner surfaces of said waste well means.

27. Apparatus according to claim 20 further including means for continuously introducing wash liquid into said waste well means.

28. Apparatus according to claim 1 wherein said loading well means and said first chamber means are contained within an insert member, and means for receiving and retaining said insert member in said centrifuge head.

29. Apparatus according to claim 1 wherein said centrifuge head includes a window portion disposed with respect to at least a part of said trap-like portion of said first chamber means, at least said part of said trap-like portion being formed of transparent materials, respectively, such as to define an optical path through said trap-like portion.

30. Apparatus according to claim 29 further including optical means operative along said optical path for measuring the volume of packed particulates in a liquid mixture centrifugally retained in said first chamber means.

31. Apparatus according to claim 1, wherein said centrifuge head further defines second loading well means and second chamber means, said second chamber means having a fluid inlet in fluid flow communication with said second loading well means for receiving liquid mixture therefrom, said second chamber means reversing upon itself in serpentine configuration so as to define a trap-like portion for centrifugally retaining liquids received from said second loading well means when said centrifuge head is rotated.

32. Apparatus according to claim 31 wherein said first and second chamber means are arranged diametrically on said centrifuge head.

33. Apparatus according to claim 31 further including means for successively and intermittently introducing different liquids containing particulates into said first and second loading well means, respectively, and on a concurrent basis, so as to be centrifugally forced into said first and second chamber means, respectively, and centrifugally retained in the corresponding trap-like portions when said centrifuge head is rotated.

34. Apparatus for determining the quantity of particulates in successive liquid mixtures, comprising a centrifuge head adapted to be rotated about an axis, said centrifuge head defining loading well means and chamber means having a fluid inlet flow communication with said loading well means, said chamber means being adapted to receive successive liquid mixtures from said loading well means, in turn, for centrifugation, and means for successively introducing liquid mixtures into said loading well means while said centrifuge head is being rotated, said introducing means including an accumulation chamber for receiving each of said liquid mixtures, means including positive pump means for supplying each of said liquid mixtures, in turn, into said accumulation chamber, and valving means associated with said accumulation chamber, said valving means being operative to seal said accumulation chamber during the introduction therein of said each liquid mixture to develop a pressure head within said accumulation chamber and operative to discharge each accumulated liquid mixture into said loading well prior to the introduction of a next liquid mixture into said accumulation chamber.

35. Apparatus according to claim 34 wherein said chamber means includes a portion formed in a serpentine configuration, so as to define a trap-like member for centrifugally retaining liquid mixture when said centrifuge head is rotated about said axis.

36. Apparatus according to claim 34 further including means for washing said accumulation chamber prior to the introduction of each liquid mixture therein, such that contamination between successive liquid mixtures introduced into said accumulation chamber is avoided.

37. Apparatus according to claim 34 wherein said pumping means includes means for directing said liquid mixtures as a continuous stream.

38. Apparatus according to claim 37 wherein successive liquid mixtures passed along in said continuous stream are separated by an inert immiscible fluid, so as to be maintained discrete.

39. Apparatus according to claim 37 wherein said pumping means includes means for passing wash liquid in said continuous stream intermediate successive liquid mixtures, whereby said wash liquid is introduced into said accumulation chamber intermediate successive liquid mixtures.

40. Apparatus according to claim 39 wherein said valving includes means for passing said wash liquid through said accumulation chamber in by-pass of said loading well means, whereby only successive liquid mixtures are passed into said loading well means and along said chamber means.

41. Apparatus according to claim 40 wherein said accumulation chamber includes a fluid inlet connected to said pumping means and a fluid outlet, said fluid outlet being connected to the fluid inlet of said valving means, said valving means having first and second fluid outlets, said first fluid outlet being adapted to pass the liquid contents of said accumulation chamber to said loading well means, said second fluid outlet being adapted to the liquid contents of said accumulation chamber in by-pass of said loading well means, and means for controlling said first and said second fluid outlets to accumulate and discharge only said liquid mixtures into said loading well.

42. Apparatus according to claim 41 further including programming means for controlling said valving means in phase with said pumping means connected to said fluid inlet of said accumulation chamber.

43. Apparatus according to claim 41 wherein said controlling means are operative to occlude said first and second fluid outlets during introduction of each of said liquid mixtures into said accumulation chamber, and further operative to occlude only said first fluid outlet during introduction and passage of said wash liquid through said accumulation chamber.

44. Apparatus according to claim 41 further including positive pumping means connected to said second fluid outlet for passing liquid from said accumulation chamber and along said second outlet.

45. Apparatus according to claim 44 wherein said valving means are operative to vent said accumulation chamber prior to the introduction of each liquid mixture therein for accumulation.

46. Apparatus for determining the quantity of particulates in a liquid mixture which have been centrifugally packed in a centrifuge chamber, comprising a centrifuge head supporting a centrifuge chamber for containing a liquid mixture, said centrifuge head adapted to be rotated to centrifugally pack said particulates in an exterior portion of said centrifuge chamber, so as to define an interface between said particulates and remaining parts of said liquid mixture along an intermediate portion of said centrifuge chamber, said intermediate portion being located along an extended light path, optical means for measuring the packed volume of said particulates in said centrifuge chamber, said optical means including means for traversing a defined light beam along said extended light path, and detector means for limiting said traversing means when said defined light beam locates said interface.

47. Apparatus according to claim 46, wherein said optical means and said detector means are disposed on opposite surfaces of said centrifuge head.

48. Apparatus according to claim 46, including means for rotating said centrifuge head, said optical means further including means for continuously tracking the interface formed between said particulates and said liquid during rotation of said centrifuge head.

49. Apparatus according to claim 46 further including means for rotating said centrifuge head, said rotating means and said optical means being operative concurrently.

50. Apparatus according to claim 46 wherein said optical means includes rotating mirror means for reflecting said light beam to traverse said optical path.

51. Apparatus according to claim 50 further including means for rotating said mirror to cause said light beam to traverse said optical path in a direction toward the exterior portion of said centrifuge chamber.

52. Apparatus according to claim 50 wherein said rotating mirror means is responsive to said detector means, said detector means being disposed along said extended light path.

53. Apparatus according to claim 46 further including means for successively traversing said light beam along said extended light path, so as to measure the packed volume of particulates contained in liquid mixtures successively introduced into said centrifuge chamber.

54. Apparatus according to claim 50 wherein said centrifuge head includes an optical window defining said extended optical path.

55. Apparatus according to claim 52 including integrator means responsive to said detector means, said rotating mirror means being responsive to said integrator means.

56. Apparatus according to claim 55, further including a differential amplifier means, said differential amplifier being connected at one input to said integrator means, offset voltage means being connected at a second input of said differential amplifier, said rotating mirror means being responsive to said differential amplifier means.

References Cited

UNITED STATES PATENTS

| | | | |
|---|---|---|---|
| 3,211,530 | 10/1965 | Harvey | 23—253 |
| 3,415,627 | 12/1968 | Rait | 23—259 X |
| 3,532,470 | 10/1970 | Rochte | 23—253 |
| 3,555,284 | 1/1971 | Anderson | 23—259 X |
| 3,586,484 | 6/1971 | Anderson | 23—259 |

MORRIS O. WOLK, Primary Examiner

R. E. SERWIN, Assistant Examiner

U.S. Cl. X.R.

23—253 R, 292; 73—61.4; 210—78; 233—1 R; 250—218; 356—36, 39